United States Patent [19]

Hyodo

[11] Patent Number: 4,781,261

[45] Date of Patent: Nov. 1, 1988

[54] FOUR-WHEEL STEERING SYSTEM FOR AUTOMOTIVE VEHICLES

[75] Inventor: Youichi Hyodo, Toyota, Japan

[73] Assignee: Toyota Jidosha Kabushiki Kaisha, Japan

[21] Appl. No.: 923,399

[22] Filed: Oct. 27, 1986

[30] Foreign Application Priority Data

Oct. 28, 1985 [JP] Japan ................. 60-240945

[51] Int. Cl.⁴ ............................................. B62D 5/10
[52] U.S. Cl. ....................................... 180/140; 280/91
[58] Field of Search ................... 180/140, 148; 280/91

[56] References Cited

U.S. PATENT DOCUMENTS

| | | | |
|---|---|---|---|
| 3,716,110 | 2/1973 | Fonda | 180/140 |
| 4,105,086 | 9/1978 | Ishii et al. | 180/140 |
| 4,313,514 | 2/1982 | Furukawa et al. | 280/91 |
| 4,572,316 | 2/1986 | Kanazawa et al. | 280/91 |
| 4,610,328 | 9/1986 | Kanazawa et al. | 180/140 |
| 4,646,867 | 3/1987 | Kanazawa et al. | 180/140 |

FOREIGN PATENT DOCUMENTS

| | | | |
|---|---|---|---|
| 59-26363 | 2/1984 | Japan | 280/91 |
| 59-26365 | 2/1984 | Japan | 280/91 |
| 59-92261 | 5/1984 | Japan | 180/140 |
| 59-26364 | 10/1984 | Japan | 280/91 |

OTHER PUBLICATIONS

Patent abstracts of Japan 60-197470, dated 5/10/85.
Patent abstracts of Japan 60-61371, dated 4/9/85.
Patent abstracts of Japan 154958, dated 8/14/85.

*Primary Examiner*—John J. Love
*Assistant Examiner*—Donn McGiehan
*Attorney, Agent, or Firm*—Parkhurst, Oliff & Berridge

[57] ABSTRACT

A four-wheel steering system for an automotive vehicle includes a front wheel steering mechanism operable in response to a steering effort applied thereto to steer a pair of dirigible front road wheels, a rear wheel steering mechanism including an axially displaceable operation rod operatively connected at the opposite ends thereof with a pair of dirigible rear road wheels to steer the rear road wheels, and a connecting mechanism assembled in combination with the rear wheel steering mechanism and being drivingly connected to the front wheel steering mechanism for effecting axial displacement of the operation rod in response to operation of the front wheel steering mechanism and for controlling the steering angle ratio and direction of the rear road wheels relative to the front road wheels. The rear wheel steering mechanism is in the form of a power assisted steering mechanism which includes a hydraulic power cylinder integrally provided with the operation rod, and a control valve operatively connected to the connecting mechanism and the operation rod to control fluid under pressure supplied into the power cylinder in accordance with the mode of operation of the connecting mechanism.

3 Claims, 8 Drawing Sheets divide# FOUR-WHEEL STEERING SYSTEM FOR AUTOMOTIVE VEHICLES

BACKGROUND OF THE INVENTION

The present invention relates to a steering system for an automotive vehicle, and more particularly to a power-assisted rear wheel steering mechanism adapted for use in a four-wheel steering system capable of steering a pair of dirigible rear road wheels in response to steering operation of a pair of dirigible front road wheels.

Such a four-wheel steering system as described above includes, in general, a front wheel steering mechanism operable in response to a steering effort applied thereto for steering a pair of dirigible front road wheels, a rear wheel steering mechanism including an axially displaceable operation rod operatively connected at the opposite ends thereof with a pair of dirigible rear road wheels for steering the rear road wheels, and a connecting mechanism assembled in combination with the rear wheel steering mechanism and being drivingly connected to the front wheel steering mechanism for effecting axial displacement of the operation rod in response to operation of the front wheel steering mechanism and for controlling the steering angle ratio and direction of the rear road wheels relative to the front road wheels. In the case that a hydraulic power cylinder is assembled within the rear wheel steering mechanism to assist axial displacement of the operation rod, it is required to provide a control valve for the power cylinder in such a manner that the power cylinder is operated under control of the control valve in accordance with the mode of operation of the connecting mechanism.

SUMMARY OF THE INVENTION

To satisfy the above-described requirement, the present invention is directed to provide a power-assisted rear wheel steering mechanism which includes a power cylinder integrally provided with the operation rod to assist axial displacement of the operation rod, and a control valve operatively connected to the connecting mechanism and the operation rod to control fluid under pressure supplied into the power cylinder in accordance with the mode of operation of the connecting mechanism.

In a practical embodiment of the present invention, the power-assisted rear wheel steering mechanism preferably includes an intermediate rod arranged in parallel with the operation rod to be axially displaced in accordance with the mode of operation of the connecting mechanism, and the control valve perferably is arranged to be operated in response to axial displacement of the intermediate rod and the operation rod.

BRIEF DESCRIPTION OF THE DRAWINGS

Additional objects, features and advantages of the present invention will become more readily apparent from the following detailed description of preferred embodiments thereof when taken together with the accompanying drawings, in which.

DETAILED DESCRIPTION OF THE PREFERRED EMBODIMENTS

Figure 1:
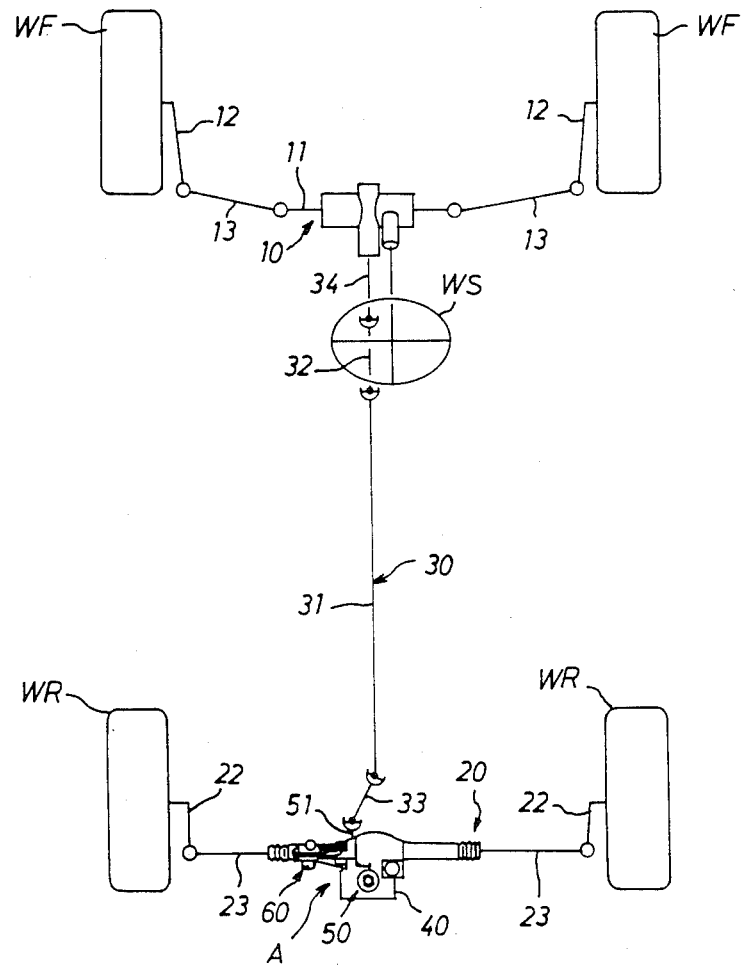
FIG. 1 is a schematic plan view of a four-wheel steering system including a connecting mechanism assembled in combination with a power-assisted rear wheel steering mechanism in accordance with the present invention.
Figure 2:
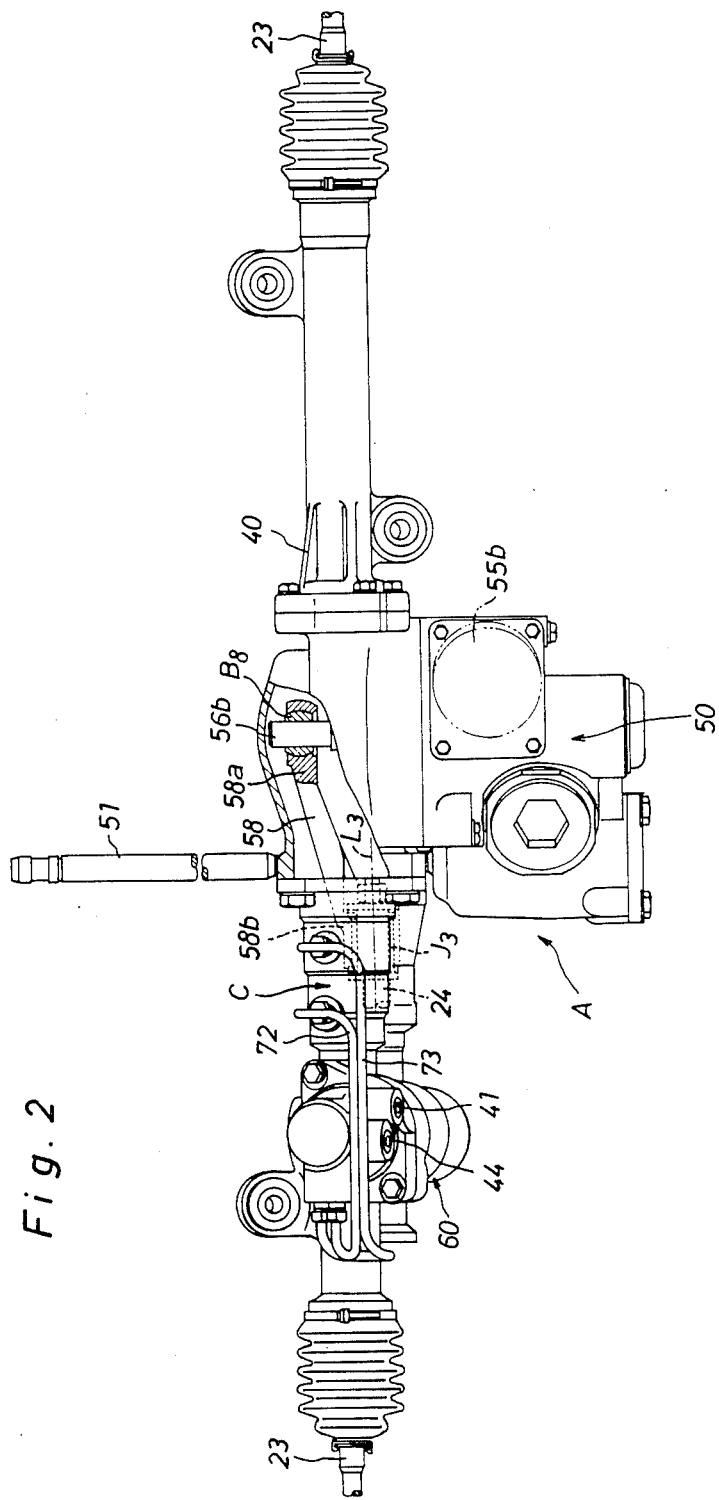
FIG. 2 is an enlarged plan view of the power-assisted rear wheel steering mechanism shown in FIG. 1.
Figure 3:
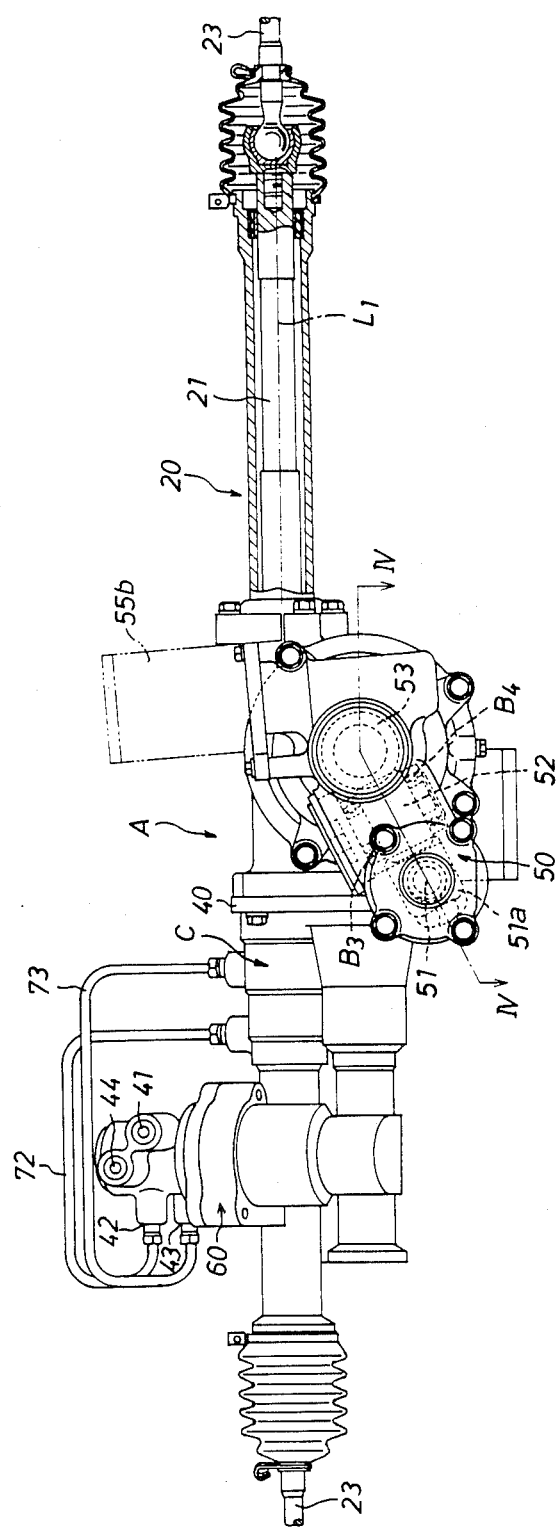
FIG. 3 is an enlarged rear view of the power-assisted rear wheel steering mechanism shown in FIG. 1.

Referring now to the drawings, particularly FIG. 1, there is schematically illustrated an automotive vehicle equipped with a four-wheel steering system which comprises a front wheel steering mechanism 10 interconnected with a power-assisted rear wheel steering mechanism 20 by means of a linkage 30. The front wheel steering mechanism 10 is in the form of a well-known steering mechanism which includes a lateral rack bar 11 arranged to be axially displaced by operation of a steering wheel WS, a pair of tie rods 13 each connected to opposite ends of rack bar 11, and a pair of knuckle arms 12 each connected to the tie rods 13 to steer a pair of digirible front road wheels WF in response to axial displacement of the rack bar 11. As shown in FIGS. 1 to 3, the rear wheel steering mechanism 20 includes a lateral tubular housing assembly 40 fixedly mounted on a body structure of the vehicle, an operation rod 21 arranged within the housing assembly 40 to be displaced along a lateral axis $L_1$, a pair of tie rods 23 each connected with opposite ends of operation rod 21, and a pair of knuckle arms 22 each connected to the tie rods 23 to steer a pair of digirible rear road wheels WR in response to axial displacement of the operation rod 21.

The linkage 30 includes a main rotary shaft 31 arranged in a fore-and-aft direction of the vehicle and rotatably supported on a body structure of the vehicle. The main rotary shaft 31 has a front end drivingly connected to a front pinion shaft 34 through an intermediate shaft 32 and a rear end drivingly connected through an intermediate shaft 33 to a connecting mechanism A which is assembled in combination with the power-assisted rear wheel steering mechanism 20. The front pinion shaft 34 is drivingly connected to the rack bar 11 to be rotated in response to axial displacement of the rack bar 11.

As shown in FIGS. 2 to 5, the connecting mechanism A comprises an input shaft 51 rotatably supported by a pair of axially spaced ball bearings $B_1$, $B_2$ mounted within housing assembly 40 and being arranged in drive connection to the linkage 30, a sector gear 52 pivotally mounted within housing assembly 40 at its axis part 52a, a slider 53, axially slidably mounted within a cylindrical bore 40a of housing assembly 40, the axis $L_2$ of which is located in the fore-and-aft direction of the vehicle and perpendicularly to the axis $L_1$ of operation rod 21, a cylindrical carrier 54 rotatably supported by a pair of axially spaced ball bearings $B_5$, $B_6$ mounted within housing assembly 40 and being arranged to rotate about the axis $L_2$ of slider 53, and a drive means 55 mounted on housing assembly 40 to effect rotary motion of the carrier 54. The connecting mechanism A further comprises a bell crank 56 rotatably supported by a pair of axially spaced needle bearings $B_7$ which are coupled within a pair of axially spaced brackets 54b of carrier 54, a first link rod 57 arranged between slider 53 and bell crank 56, and a second link rod 58 arranged between the bell crank 56 and an intermediate rod 24. (see FIG. 2)

Figure 4:
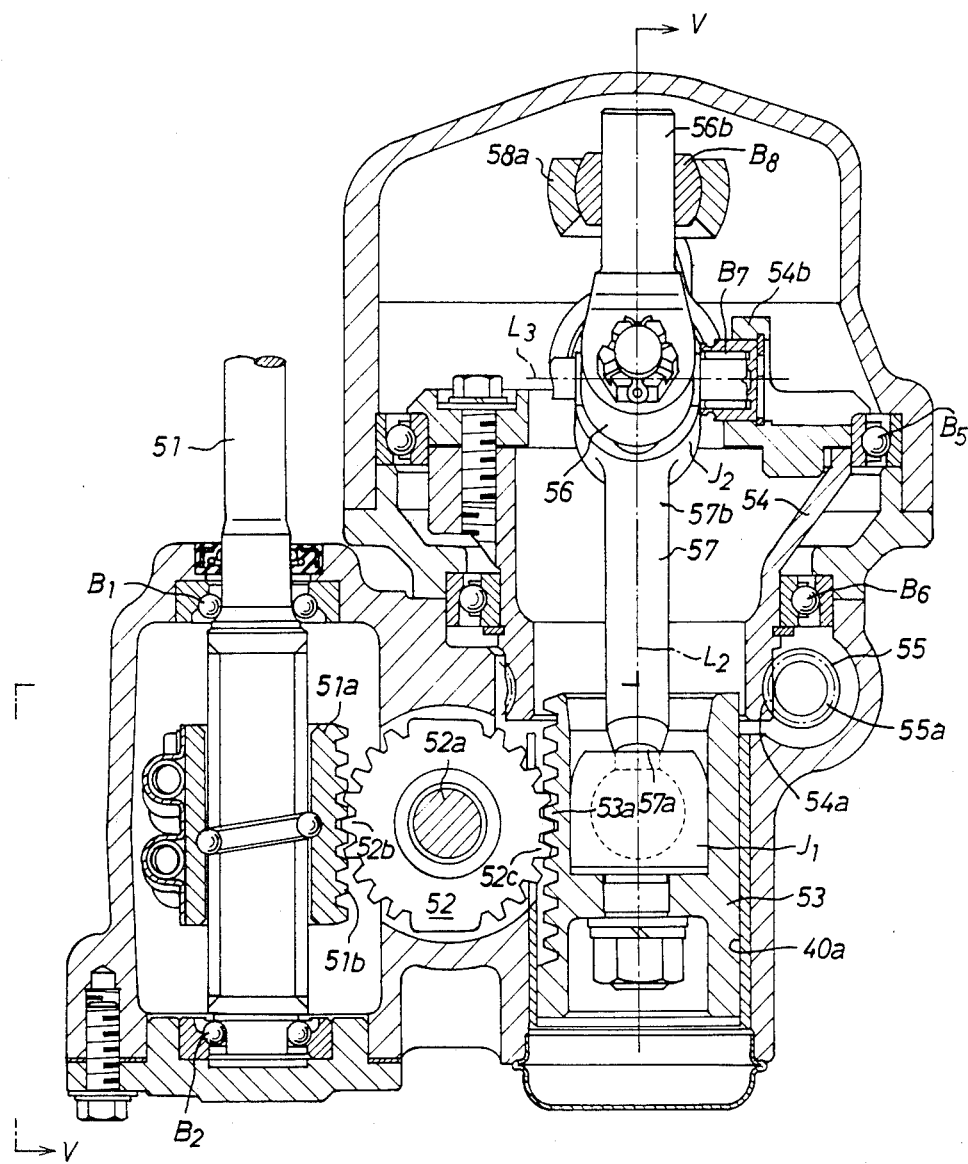
FIG. 4 is an enlarged cross-sectional plan view taken along line IV—IV in FIG. 3.
Figure 5:
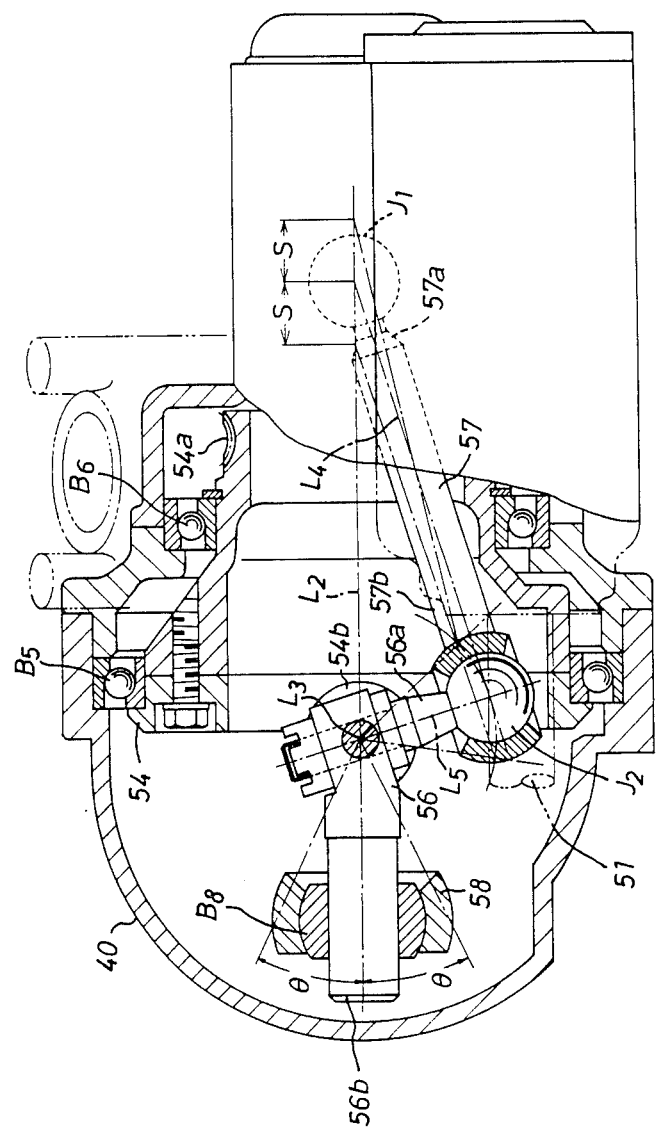
FIG. 5 is a fragmentary cross-sectional side view taken along line V—V in FIG. 4.

As shown in FIG. 4, the input shaft 51 is provided thereon with a ball nut 51a which has a rack portion 51b in mesh with a toothed portion 52b of sector gear 52. As shown in FIG. 3, the sector gear 52 is rotatably supported at its axis part 52a by means of a pair of axially spaced bearings $B_3$ and $B_4$ mounted within housing assembly 40. The slider 53 is in the form of a cylindrical piston which is formed at one side thereof with a rack portion 53a in mesh with another toothed portion 52c of sector gear 52. The rear end portion of carrier 54 is formed as a worm gear 54a. The drive means 55 includes a pinion 55a in mesh with the worm gear 54a of carrier 54, and a reversible electric motor 55b mounted on housing assembly 40 and drivingly connected to pinion 55a to effect rotary motion of the carrier 54 in accordance with the vehicle speed. When the front and rear wheel steering mechanisms 10 and 20 each are conditioned in a neutral position to maintain straight travel of the vehicle, the drive means 55 is conditioned to retain the carrier 54 in a neutral position where the rotational axis $L_3$ of bell crank 56 is located in parallel with the axis $L_1$ of operation rod 21. As shown in FIG. 5, the bell crank 56 is integrally provided with first and second arms 56a, 56b which are arranged to respectively extend downward and along the axis $L_2$ of slider 53 when the carrier 54 is being retained in the neutral position.

Figure 8:
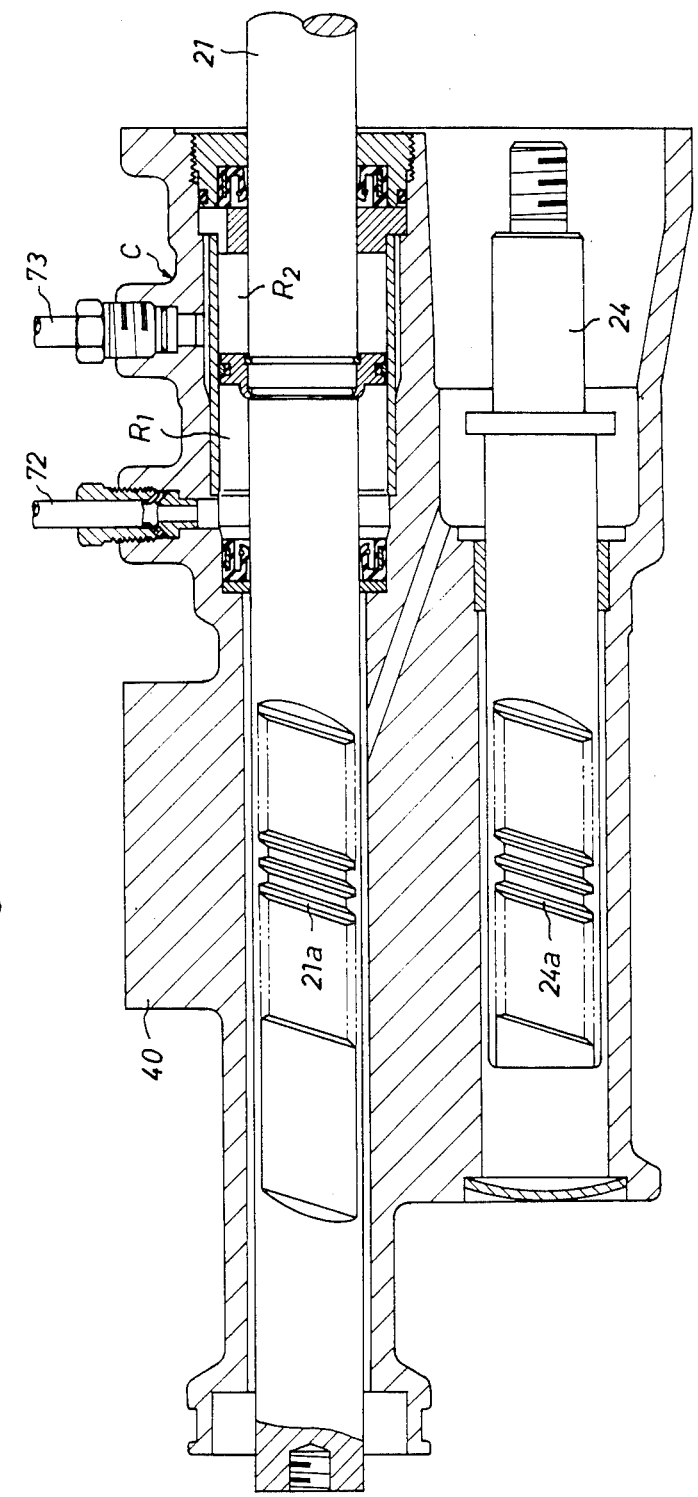
FIG. 8 is a sectional view illustrating a hydraulic power cylinder and an intermediate rod in the power-assisted rear wheel steering mechanism.

The first link rod 57 has a rear end 57a pivotally connected with the slider 53 by means of a ball joint, and a front end 57b pivotally connected with a swingable end of first arm 56a of bell crank 56 by means of a ball joint $J_2$. In this embodiment, the first link rod 57 is arranged in such a manner that when the carrier 54 is retained in the neutral position, an axis line $L_4$ between respective centers of ball joints $J_1$ and $J_2$ makes an angle of approximately 90° with an axis line $L_5$ between the rotational axis $L_3$ of bell crank 56 and the center of ball joint $J_2$. As shown in FIGS. 2 and 5, the second link rod 58 has one end portion 58a slidably and pivotally connected with the second arm 56b of bell crank 56 through a spherical bearing, and another end portion 58b rotatably connected with the intermediate rod 24 by means of a pin joint $J_3$. As shown in FIG. 8, the intermediate rod 24 is arranged in parallel with the operation rod 21 and axially slidably mounted within housing assembly 40. When the carrier 54 is retained in the neutral position, the axis of intermediate rod 24 coincides with the rotational axis $L_3$ of bell crank 56.

Figure 6:
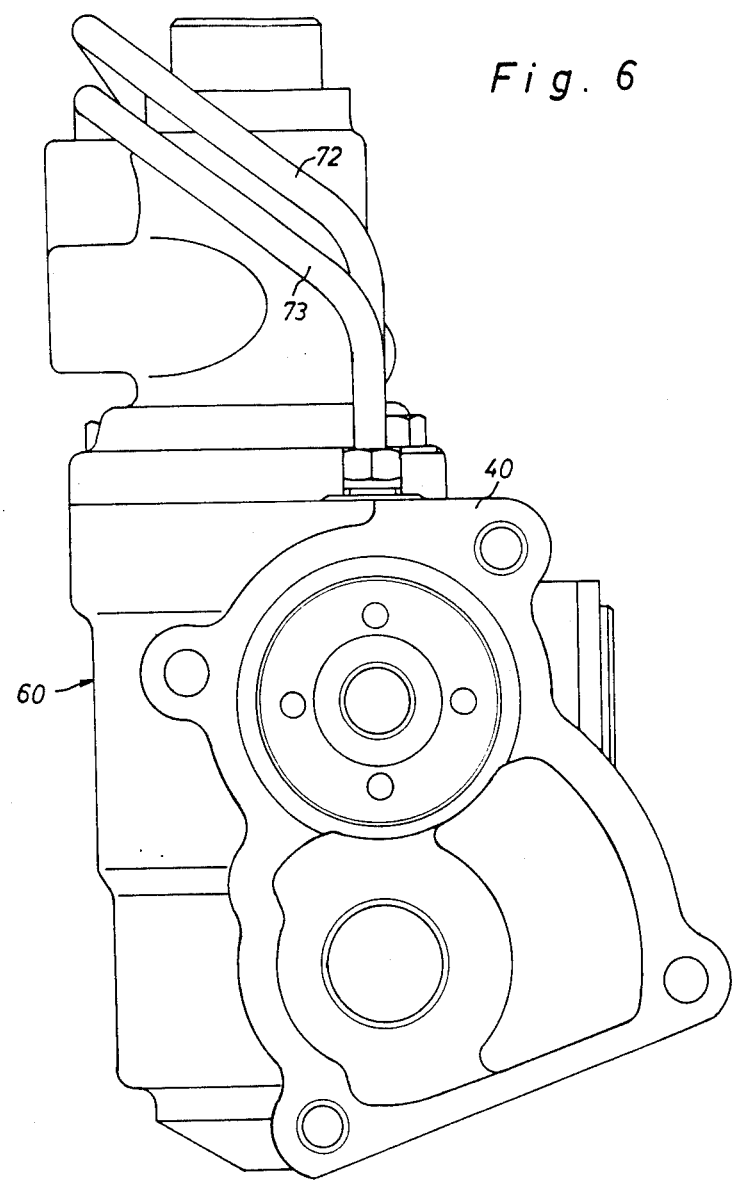
FIG. 6 is an enlarged side view of a control valve shown in FIGS. 2 and 3.
Figure 7:
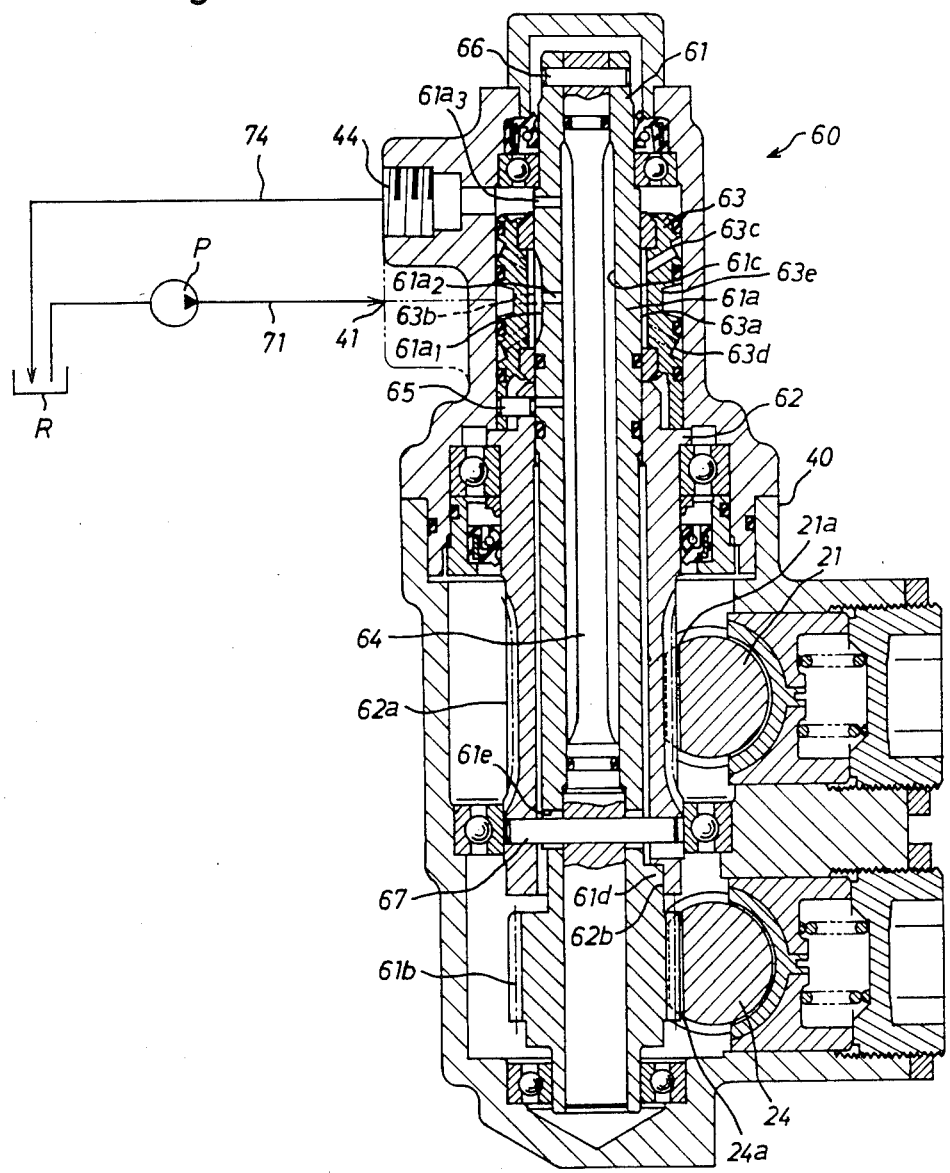
FIG. 7 is a sectional view of the control valve shown in FIG. 6.

In the rear wheel steering mechanism 20, a hydraulic power cylinder C is provided within housing assembly 40 to assist axial displacement of the operation rod 21, and a control valve 60 is mounted on housing assembly 40 to control fluid under pressure supplied into the power cylinder C in response to operation of the connecting mechanism A. As shown in FIGS. 6 and 7, the control valve 60 is in the form of a rotary valve of the open center type which includes a hollow input shaft 61, a hollow output shaft 62, a valve sleeve 63 and a torsion bar 64. The input shaft 61 is rotatably supported by a pair of axially spaced ball bearings within housing assembly 40, and is integrally formed at its intermediate portion with a valve rotor 61a and at its lower end with a pinion 61b which is in mesh with a rack portion 24a of intermediate shaft 24 to rotate in accordance with axial displacement of the intermediate shaft 24.

The valve rotor 61a is formed in its outer circumference with a plurality of circumferentially equi-spaced axial grooves $61a_1$ of semi-circular cross-section and is formed therein with a plurality of radial passages $61a_2$ which communicate a part of axial grooves $61a_1$ into an internal axial bore 61c of input shaft 61. The valve rotor 61a is further formed therein with a radial passage $61a_3$ which is located above the valve sleeve 63. The radial passage $61a_3$ is in open communication with the internal axial bore 61c and with a port 44 which is connected to a fluid reservoir R by means of a conduit 74.

The output shaft 62 is coupled over the input shaft 61 for relative rotation and is rotatably supported by a pair of axially spaced bearings within housing assembly 40. The output shaft 62 is integrally formed at its intermediate portion with a pinion 62a which is in mesh with a rack portion 21a of operation rod 21 to cause axial displacement of operation rod 21 in response to rotation of the output shaft 62. The output shaft 62 is further formed in its lower end with a semi-circular recess 62b, while the input shaft 61 is formed with a projection 61d which is contained within the semi-circular recess 62b of output shaft 62 to restrict relative rotation between the input and output shafts 61 and 62 to a predetermined extent.

The valve sleeve 63 is arranged in surrounding relationship with the valve rotor 61a for relative rotation, and is connected to the upper end of output shaft 62 by means of a lateral pin 65. The valve sleeve 63 is formed in its inner circumference with a plurality of circumferentially equi-spaced axial grooves 63a and is formed in its outer circumference with first and second annular grooves 63c and 63d. A part portion of axial grooves 63a is in open communication with the first annular groove 63c, while the other part portion of axial grooves 63a is in open communication with the second annular groove 63d. The first annular groove 63c is in open communication with a port 42 which is connected to a left-hand pressure chamber $R_1$ in power cylinder C by means of a conduit 72, while the second annular groove 63d is in open communication with a port 43 which is connected to a right-hand pressure chamber $R_2$ in power cylinder C by means of a conduit 73. The valve sleeve 63 is further formed in its outer circumference with a central annular groove 63e which is in open communication with an inlet port 41 connected through a conduit 71 to a source of fluid under pressure in the form of a hydraulic pump P driven by n prime mover of the vehicle. The central annular groove 63e is alternately in open communication with the axial grooves 63a through radial passages 63b in a usual manner. The torsion bar 64 is inserted into the input shaft 61 and connected to the upper end of input shaft 61 by means of a lateral pin 66 and to the lower end of output shaft 62 by means of a lateral pin 67 which is arranged across a pair of radial holes 61e in the input shaft 61.

Hereinafter, the operation of the four-wheel steering system will be described in detail. When the steering wheel WS is operated to turn the vehicle to the right or left, the rack bar 11 is displaced in a lateral direction to steer the front road wheels WF and to rotate the input shaft 51 of connecting mechanism A through the linkage 30. Assuming that the carrier 54 is being retained in the neutral position during rotation of the input shaft 51, the rotational axis $L_3$ of bell crank 56 is located in parallel with the axis $L_1$ of operation rod 21. In such a condition, the sector gear 52 is rotated counterclockwise or clockwise in response to rotation of the input shaft 51 to effect forward or backward movement of the slider 53, and in turn the bell crank 56 is rotated clockwise or counterclockwise in FIG. 5. This causes only a conical motion of second link rod 58 about the rotational axis $L_3$ of bell crank, but does not cause any lateral movement of second link rod 58. Thus, the intermediate rod 24 and operation rod 21 are maintained in their neutral positions to retain the rear road wheels WR in their neutral positions even when the front road wheels WF are steered to the right or left.

Assuming that the drive means 55 is activated to rotate the carrier 54 counterclockwise by 90°, the rotational axis $L_3$ of bell crank 56 makes an angle of 90° with the axis of intermediate rod 24. In such a condition, the bell crank 56 is rotated counterclockwise or clockwise in response to forward or backward movement of the slider 53. This causes leftward or rightward displacement of second link rod 58 along the axis $L_1$ of operation rod 21, and causes the intermediate rod 24 to displace leftward or rightward so as to rotate the input shaft 61 of control valve 60 counterclockwise or clockwise. Thus, the operation rod 21 is displaced leftward or rightward through the output shaft 62 of control valve 60, and subsequently the control valve 60 is operated to permit the flow of fluid under pressure from the hydraulic pressure source P to the pressure chamber $R_2$ or $R_1$ of power cylinder C, and in turn the power cylinder C is activated to assist the leftward or rightward displacement of operation rod 21 thereby to steer the rear road wheels WR to the right or left. It is therefore possible to steer the rear road wheels WR in the same direction as that of the front road wheels WF. This operation is effected in a condition where the rotational axis $L_3$ of bell crank 56 is inclined rightward at an angle with respect to a standard plane defined by the axis of intermediate rod 24 and the rotational axis $L_2$ of carrier 54. In addition, the ratio of the steering angle of the rear road wheels WR relative to that of the front road wheels WF is determined by the inclined angle of the rotational axis $L_3$ of bell crank 56 to the axis of intermediate rod 24 and becomes a maximum value when the inclined angle is 90°.

Assuming that the drive means 55 is activated to rotate the carrier 54 clockwise from the neutral position by 90°, the rotational axis $L_3$ of bell crank 56 makes an angle of 90° with the axis of intermediate rod 24. In such a condition, the bell crank 56 is rotated clockwise or counterclockwise in response to forward or backward movement of the slider 53. This causes rightward or leftward displacement of second link rod 58 along the axis $L_1$ of operation rod 21 and causes the intermediate rod 24 to displace rightward or leftward so as to rotate the input shaft 61 of control valve 60 clockwise or counterclockwisely. Thus, the operation rod 21 is displaced rightwards or leftwards through the output shaft 62 of control valve 60, and subsequently the control valve 60 is operated to permit the flow of fluid under pressure from the hydraulic pressure source P to the pressure chamber $R_1$ or $R_2$ of power cylinder C, and in turn the power cylinder C is activated to assist the rightward or leftward displacement of operation rod 21 thereby to steer the rear road wheels WR to the left or right. It is therefore possible to steer the rear road wheels WR in an opposite direction to that of the front road wheels WF. This operation is effected in a condition where the rotational axis $L_3$ of bell crank 56 is inclined leftward at an angle with respect to the standard plane defined by the axis of intermediate rod 24 and the rotational axis $L_2$ of carrier 54. In addition, the ratio of the steering angle of the rear road wheels WR relative to that of the front road wheels WF is determined by the inclined angle of the rotational axis $L_3$ of bell crank 56 to the axis of intermediate rod 24 and becomes a maximum value when the inclined angle is 90°.

As is understood from the above description, the power-assisted rear wheel steering mechanism 20 is characterized in that the hydraulic power cylinder C is integrally provided with the operation rod 21 to be activated under control of the control valve 60, and that the intermediate rod 24 is arranged in parallel with the operation rod 21 to operate the control valve 60 in accordance with the mode of operation of the connecting mechanism A. In this arrangement, the control valve 60 acts to operate the power cylinder C in the same direction as the displacement direction of intermediate rod 24. It is therefore able to assemble the power cylinder C within the rear wheel steering mechanism 20 in a simple construction without providing any other changeover valve between the control valve 60 and the power cylinder C.

In a practical embodiment of the present invention, it is desirable that the electric motor 55b of drive means 55 be controlled to rotate the carrier 54 about the axis $L_2$ of slider 53 in accordance with the vehicle speed. With such control of the electric motor 55b of drive means 55, the direction and angle of the rotational axis $L_3$ of bell crank 56 can be varied to control the steering angle ratio and direction of the rear road wheels WF relative to the front road wheels WF in accordance with the vehicle speed. When the carrier 54 is rotated in a condition shown in FIGS. 4 and 5 to vary the direction and angle of the rotational axis $L_3$ of bell crank 56, the bell crank 56 rotates with carrier 54 to cause a conical motion of the first link rod 57 with an apex at ball joint $J_1$, while the second link rod 58 is retained in the neutral position to avoid lateral displacement of the intermediate rod 24. This is effective to ensure the steering stability of the vehicle without causing any change in the alignment of rear road wheels WR.

Furthermore, in the above embodiment the first arm 56a of bell crank 56 is connected to the first link rod 57 in such a manner that the axis line $L_4$ between ball joints $J_1$, $J_2$ makes an angle of approximately 90° with the axis line $L_5$ between the rotation axis $L_3$ of bell crank 56 and the center of ball joint $J_2$, and the second arm 56b of bell crank 56 is axially slidably coupled with the one end portion 58a of second link rod 58. With such an arrangement of the bell crank 56, a rotation angle $\theta$ of second arm 56b caused by forward movement of first link rod 57 in a predetermined distance S becomes substantially equal to a rotation angle $\theta$ of second arm 56b caused by backward movement of first link rod 57 in the same distance S. As a result, in operation of the rear wheel steering mechanism 20, the axial movement amount of operation rod 21 in one direction caused by rotation of the input shaft 51 can be made substantially equal to that of operation rod 21 in the opposite direction caused by reverse rotation of the input shaft 51.

In practical embodiments of the present invention, the connecting mechanism A may be modified as follows. Although in the above embodiment, the input shaft 51, sector gear 52 and slider 53 have been provided to effect axial movement of the first link rod 57 in response to rotation of the main rotary shaft 31 of linkage 30, the linkage 30 may be replaced with a reciprocable linkage to directly effect axial movement of the first link rod 57 in response to operation of the front wheel steering mechanism 10. In such a modification, it is possible to eliminate the input shaft 51, sector gear 52, slider 53 and the component parts associated therewith.

Having now fully set forth both structure and operation of certain preferred embodiments of the concept underlying the present invention, various other embodiments as well as certain variations and modifications of the embodiments herein shown and described will obviously occur to those skilled in the art upon becoming familiar with said underlying concept. It is therefore to be understood that within the scope of the appended claims the invention may be practiced otherwise than as specifically set forth herein.

What is claimed is:

1. A four-wheel steering system for an automotive vehicle having a pair of dirigible front road wheels and a pair of dirigible rear road wheels, comprising a front wheel steering mechanism operable in response to a steering effort applied thereto to steer the front road wheels, a rear wheel steering mechanism including an axially displacable operation rod operatively connected at opposite ends thereof with the rear rod wheels to steer the rear road wheels, and a connecting mechanism assembled in combination with said rear wheel steering mechanism and being drivingly connected to said front wheel steering mechanism for effecting axial displacement of said operation rod in response to operation of said front wheel steering mechanism and for controlling the steering angle ratio and direction of the rear road wheels relative to the front road wheels, wherein said rear wheel steering mechanism comprises:

a power-assisted steering mechanism which includes a hydraulic power cylinder integrally provided with said operation rot to assist axial displacement of said operation rod, an intermediate rod arranged in parallel with said operation rod to be axially displaced in accordance with the mode of operation of said connecting mechanism, a control valve operatively connected to said intermediate rod and said operation rod to control fluid under pressure supplied into said power cylinder in accordance with the mode of operation of said connecting mechanism, and a tubular housing assembly to be mounted on a body structure of the vehicle, said housing assembly supporting thereon said operation rod and said intermediate rod in parallel and being provided therein with said power cylinder, and wherein said control valve is mounted on said housing assembly and includes an input element drivingly connected with said intermediate rod to be operated in accordance with the mode of operation of said connecting mechanism and an output element drivingly connected with said operation rod to effect axial displacement of said operation rod in response to operation of said input element, said connecting mechanism comprising a carrier rotatably mounted within said housing assembly and being arranged to rotate about a first axis perpendicular to the longitudinal axis of said operation rod, drive means mounted on said housing assembly to effect rotary motion of said carrier about said first axis, a bell crank rotatably mounted on said carrier and being arranged to rotate about a second axis in parallel with the longitudinal axis of said operation rod when said carrier is retained in a neutral position, said bell crank having a first arm extending therefrom at a predetermined angle to said first axis and a second arm extending therefrom along said first axis, a first link rod having one end pivotally connected with the first arm of said bell crank and the other end operatively connected to said front wheel steering mechanism to be moved along said first axis in response to operation of said front wheel steering mechanism, and a second link rod pivotally connected with the second arm of said bell crank and connected at one end thereof with said intermediate rod.

2. A four-wheel steering system as claimed n claim 1, wherein the other end of said first link rod is drivingly connected to said front wheel steering mechanism by means of a linkage arranged in a fore-and-aft direction of the vehicle.

3. A four-wheel steering system for an automotive vehicle having a pair of dirigible front road wheels and a pair of dirigible rear road wheels, comprising a front wheel steering mechanism operable in response to a steering effort applied thereto to steer the front road wheels, a rear wheel steering mechanism including an axially displacable operation rod operatively connected at opposite ends thereof with the rear road wheels to steer the rear road wheels, and a connecting mechanism assembled in combination with said rear wheel steering mechanism and being drivingly connected to said front wheel steering mechanism for effecting axial displacement of said operation rod in response to operation of said front wheel steering mechanism and for controlling the steering angle ratio and direction of the rear wheels relative to the front road wheels, wherein said rear steering mechanism comprises:

a power-assisted steering mechanism which includes a hydraulic power cylinder integrally provided with said operation rod to assist axial displacement of said operation rod, an intermediate rod arranged in parallel with said operation rod to be axially displaced in accordance with the mode of operation of said connecting mechanism, a control valve operatively connected to said intermediate rod and said operation rod to control fluid under pressure supplied into said power cylinder in accordance with the mode of operation of said connecting mechanism, and a tubular housing assembly to be mounted on a body structure of the vehicle, said housing assembly supporting thereon said operation rod and said intermediate rod in parallel and being provided therein with said power cylinder, and wherein said control valve is mounted on said housing assembly and includes an input element drivingly connected with said intermediate rod to be operated in accordance with the mode of operation of said connecting mechanism and an output element drivingly connected with said operation rod to effect axial displacement of said operation rod in response to operation of said input element, wherein the input element of said control valve in a first shaft rotatably mounted within said housing assembly and is integrally formed with a pinion in mesh with a rack portion of said intermediate rod, and wherein the output element of said control valve is a second hollow shaft coupled over said first shaft for relative rotation and is integrally formed with a pinion in mesh with a rack portion of said operation rod.

* * * * *